(12) United States Patent
Iwashimizu et al.

(10) Patent No.: US 11,977,219 B2
(45) Date of Patent: May 7, 2024

(54) OPTICAL COMPENSATION SYSTEM AND OPTICAL COMPENSATION METHOD

(71) Applicants: MITSUBISHI HEAVY INDUSTRIES, LTD., Tokyo (JP); RIKEN, Wako (JP); Institute for Laser Technology, Osaka (JP)

(72) Inventors: Masashi Iwashimizu, Tokyo (JP); Hiroyuki Daigo, Tokyo (JP); Shingo Nishikata, Tokyo (JP); Kazunori Masukawa, Tokyo (JP); Atsushi Ochiai, Tokyo (JP); Toshikazu Ebisuzaki, Saitama (JP); Satoshi Wada, Saitama (JP); Yoshiyuki Takizawa, Saitama (JP); Masayuki Maruyama, Wako (JP); Shinji Motokoshi, Saitama (JP)

(73) Assignees: MITSUBISHI HEAVY INDUSTRIES, LTD., Tokyo (JP); RIKEN, Tokyo (JP); INSTITUTE FOR LASER TECHNOLOGY, Osaka (JP)

( * ) Notice: Subject to any disclaimer, the term of this patent is extended or adjusted under 35 U.S.C. 154(b) by 456 days.

(21) Appl. No.: 17/269,727

(22) PCT Filed: Aug. 7, 2019

(86) PCT No.: PCT/JP2019/031028
§ 371 (c)(1),
(2) Date: Feb. 19, 2021

(87) PCT Pub. No.: WO2020/100360
PCT Pub. Date: May 22, 2020

(65) Prior Publication Data
US 2021/0318534 A1 Oct. 14, 2021

(30) Foreign Application Priority Data
Nov. 13, 2018 (JP) .................................. 2018-212665

(51) Int. Cl.
G02B 26/00 (2006.01)
G01J 9/00 (2006.01)
(Continued)

(52) U.S. Cl.
CPC .............. *G02B 26/00* (2013.01); *G01S 17/95* (2013.01); *G02B 23/24* (2013.01); *G02B 26/06* (2013.01); *G02B 27/0068* (2013.01); *G01J 9/00* (2013.01)

(58) Field of Classification Search
CPC .... G02B 26/00; G02B 23/24; G02B 27/0068; G02B 26/06; G01S 17/95; Y20A 90/10; G01J 9/00; G01J 2009/002
See application file for complete search history.

(56) References Cited

U.S. PATENT DOCUMENTS

2004/0124335 A1 7/2004 Cicchiello et al.
2012/0018614 A1* 1/2012 King .................. G02B 26/0816
250/201.9

(Continued)

FOREIGN PATENT DOCUMENTS

JP 10-048337 2/1998
JP H1048337 A * 2/1998

(Continued)

OTHER PUBLICATIONS

Extended European Search Report dated Sep. 7, 2021 in corresponding European Patent Application No. 19884564.6.

(Continued)

Primary Examiner — Jennifer D Bennett
(74) Attorney, Agent, or Firm — Wenderoth, Lind & Ponack, L.L.P.

(57) ABSTRACT

An optical correction is predictively performed based on a result of AI learning previously performed by use of learning data including measurement data. The optical compensation (Continued)

system is provided with wavefront correction optics, a sensor and a controller. The wavefront correction optics corrects a wavefront of light that passes through a given optical path. The sensor obtains environmental information in the optical path. The controller calculates, based on the environmental information, a predicted wavefront disturbance of the light that has passed through the optical path and controls the wavefront correction optics so as to cancel the predicted wavefront disturbance.

11 Claims, 6 Drawing Sheets

(51) Int. Cl.
*G01S 17/95* (2006.01)
*G02B 23/24* (2006.01)
*G02B 26/06* (2006.01)
*G02B 27/00* (2006.01)

(56) References Cited

U.S. PATENT DOCUMENTS

2014/0268096 A1* 9/2014 Lebow .................... G01S 7/487
356/4.01
2018/0254597 A1* 9/2018 Van Der Post ....... H01S 3/0092

FOREIGN PATENT DOCUMENTS

| JP | 2003-075762 | 3/2003 |
| JP | 2011-185567 | 9/2011 |
| WO | 2016-047100 | 3/2016 |

OTHER PUBLICATIONS

English translation of the International Preliminary Report on Patentability dated May 27, 2021 in International (PCT) Application No. PCT/JP2019/031028.

International Search Report dated Oct. 29, 2019 in International (PCT) Application No. PCT/JP2019/031028.

* cited by examiner

OPTICAL COMPENSATION SYSTEM AND OPTICAL COMPENSATION METHOD

TECHNICAL FIELD

The present invention relates to an optical compensation system and an optical compensation method.

BACKGROUND ART

When light propagates in an atmosphere, a wavefront of the light is disturbed by influences of atmospheric fluctuation or the like. For example, in a technical field of astronomical observation and the like, an original resolution of a telescope may not be exhibited and images taken through the telescope may be blurred.

In order to resolve such problems, a technique called optical compensation is developed. As an example, a technique of compensating a wavefront of light by measuring a disturbance of the wavefront of the light propagated through an atmosphere and controlling a deformable mirror based on a result of the measuring.

In relation with the above, patent literature 1 (Japanese Patent Publication No. 2011-185567) discloses a high-power laser irradiation apparatus. This high-power laser irradiation apparatus is provided with a laser light source, an optical distributor, a plurality of optical phase shifters, a plurality of optical amplifiers, output optics, a reflected light receiver and an atmosphere compensation signal processor. Herein, the laser light source generates laser. The optical distributor distributes the laser generated by the laser light source. The plurality of optical phase shifters shifts a phase of each laser distributed by the optical distributor, respectively. The plurality of optical amplifiers amplifies the laser with the phase shifted by each optical phase shifter, respectively. The output optics combines respective laser amplified by each optical amplifier to output. The reflected light receiver detects reflected light that is emitted from the output optics, reflected at an irradiation target and returned by propagating in the atmosphere. The atmosphere compensation signal processor detects a disturbance of light wavefront due to atmosphere fluctuation from a detection signal of the reflected light receiver and controls phase shifting of the optical phase shifter so as to correct the disturbance of the light wavefront.

The high-power laser irradiation apparatus of the patent literature 1 (Japanese Patent Publication No. 2011-185567) corrects by acquiring information of atmosphere fluctuation from reflected light from the irradiation target. Therefore, only transmitting laser light can be corrected.

CITED LIST

Patent Literature

[Patent Literature 1] Japanese Patent Publication No. 2011-185567

SUMMARY

In view of the above situation, a system or a method of optical compensation of performing optical compensation based on environmental information will be provided. Other problem to be solved and novel features will become apparent from disclosures of the present description and attached drawings.

According to an embodiment, an optical compensation system is provided with wavefront correction optics, a sensor and a controller. The wavefront correction optics corrects a wavefront of light that passes through a given optical path. The sensor obtains environmental information in the optical path. The controller calculates, based on the environmental information, a predicted wavefront disturbance of the light that has passed through the optical path and controls the wavefront correction optics so as to cancel the predicted wavefront disturbance.

According to an embodiment, an optical compensation method includes obtaining environmental information in a given optical path and controlling wavefront correction optics based on the environmental information. The controlling includes calculating a predicted wavefront disturbance based on weather conditions and correlation information and generating a control signal so as to cancel the predicted wavefront disturbance.

According to the above-described embodiment, optical compensation can be predictively performed based on environmental information.

DETAILED DESCRIPTION

Embodiments of an optical compensation system and an optical compensation method according to the present invention will be explained in the following, with reference to attached drawings.

First Embodiment

Figure 1:
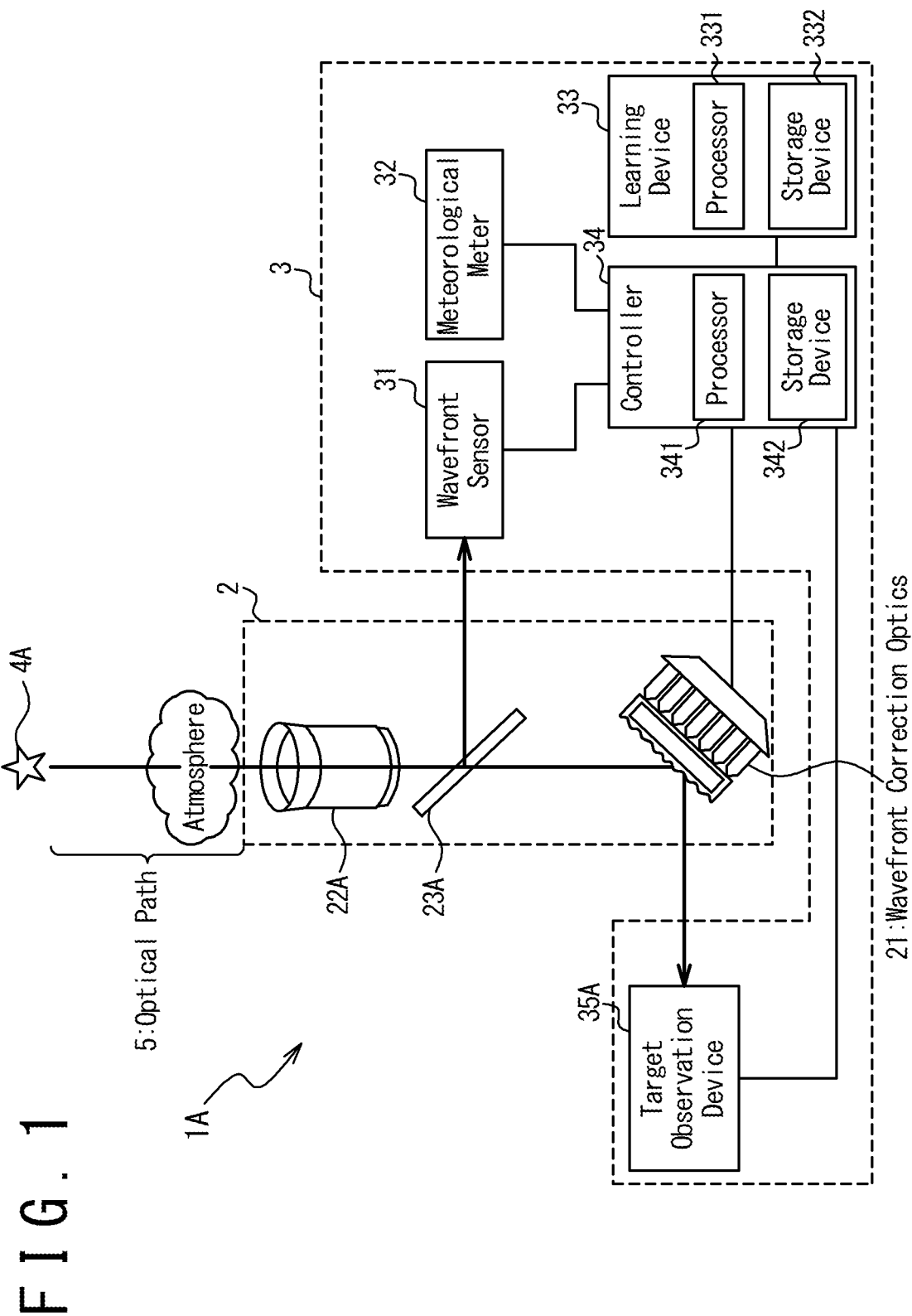
FIG. 1 is a block circuit diagram that shows a configuration example of an optical compensation system according to an embodiment.

FIG. 1 is a block circuit diagram that shows a configuration example of an optical compensation system 1A according to an embodiment. The optical compensation system 1A in FIG. 1 is provided with correction optics 2 and a control system 3.

Herein, the optical compensation system 1A is configured to be able to observe light that reaches from a target 4A via the correction optics 2. The correction optics 2 is configured to perform optical correction under a control of the control system 3. The control system 3 is configured to control the correction optics 2.

The correction optics 2 is provided with wavefront correction optics 21, ground optics 22A and a half mirror 23A. Herein, the wavefront correction optics 21 corrects the wavefront of the light that reaches from the target 4A under a control of the control system 3. The wavefront correction optics 21 is, for example, a deformable mirror. The ground optics 22A are, for example, optics such as a telescope arranged on the ground, and are configured to guide the light that reaches from the target 4A to the wavefront correction optics 21. The ground optics 22A are configured, for example, as a combination of various optical devices such as a lens or a mirror. The half mirror 23A is configured to guide a part of the light that reaches from the target 4A to the wavefront correction optics 21 and guide a rest thereof to the control system 3. In the present embodiment, the half mirror 23A is arranged in a path that the light that reaches from the target 4A to the target observation device 35A follows, and in particular, is arranged between the ground optics 22A and the wavefront correction optics 21. In the present embodiment, the half mirror 23A may be configured to be movable out of this path in a practical stage that will be described later.

The control system 3 is provided with a wavefront sensor 31, a meteorological meter 32, a learning device 33, a controller 34 and a target observation device 35A. The wavefront sensor 31 is configured to receive the light that reaches from the target 4A via the half mirror 23A and measure wavefront disturbance of this light to generate wavefront information. The meteorological meter 32 is configured to observe weather to generate weather information. An Artificial Intelligence (AI), that outputs wavefront information based on weather information, is made to learn by the learning device 33. The controller 34 is configured to control the wavefront correction optics 21 based on all or a part of the wavefront information, the weather information and learning result information. The target observation device 35A is configured to receive the light that reaches from the target 4A, via the wavefront correction optics 21, and provide observation information obtained by observing the target 4A by use of this light to the controller 34.

The learning device 33 is provided with a processor 331 and a storage device 332. The processor 331 executes a program stored in the storage device 332 to make the AI learn and stores information of the AI that has learned in the storage device 332. The storage device 332 stores the program that the processor 331 executes and the information of the AI that has learned. The storage device 332 may further store all or a part of the wavefront information, the weather information and the observation information. In addition, if a state of the atmosphere in the optical path 5, or an environment of the optical path 5 in other words, can be measured, any sensor may be used, without limitation to the meteorological meter 32.

The controller 34 is provided with a processor 341 and a storage device 342. The processor 341 executes a program stored in the storage device 342 to generate a control signal to control the wavefront correction optics 21. The storage device 342 stores the program to be executed by the processor 341 and various data to be used by the processor 341 to generate the control signal. The controller 34 includes a computer for example.

In an embodiment, each of the learning device 33 and the controller 34 is provided with an interface that is not illustrated and is connected via those interfaces. The learning device 33 and the controller 34 perform transmission and reception of various data via those interfaces.

Figure 2:
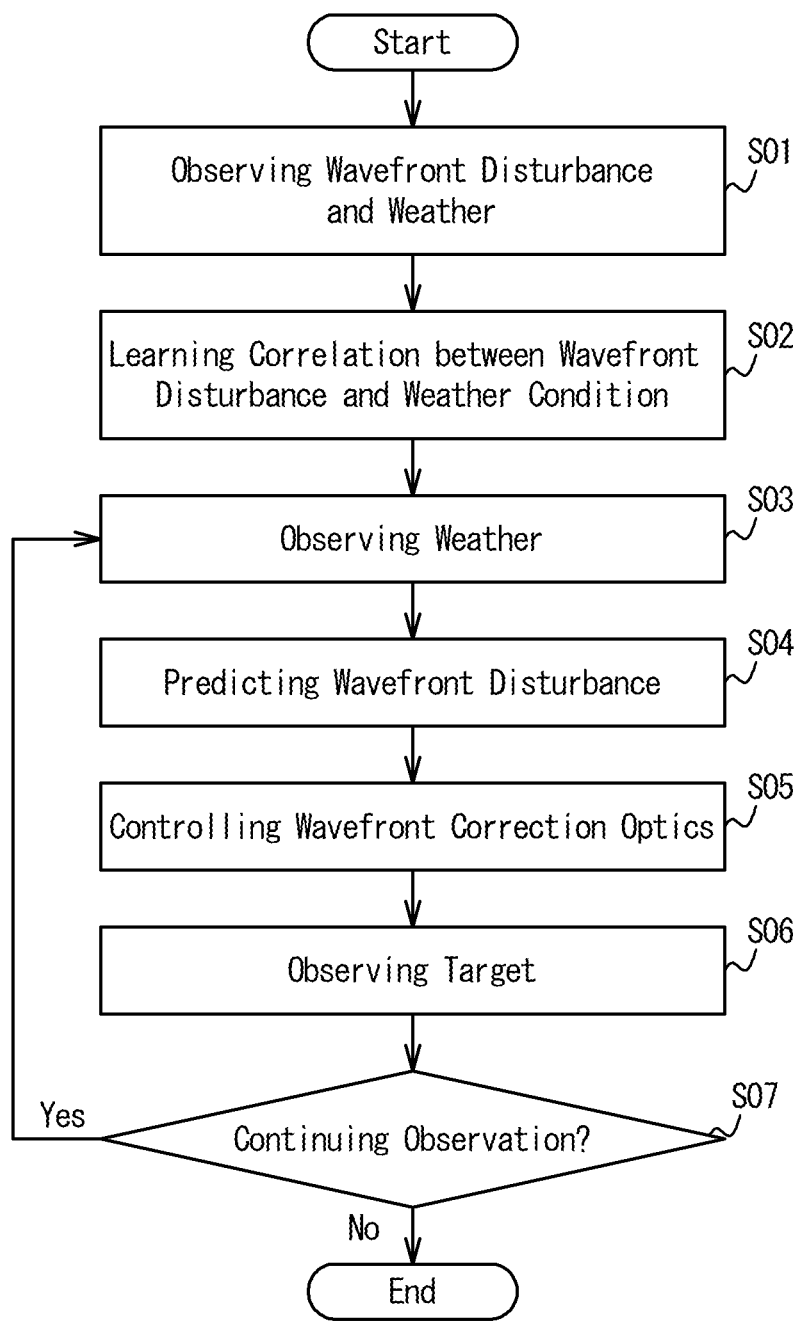
FIG. 2 is a flowchart that shows a configuration example of processes included in an optical compensation method according to an embodiment.

FIG. 2 is a flowchart that shows a configuration example of processes included in the optical compensation method according to an embodiment. Operations of the optical compensation system 1A in FIG. 1, that is, the optical compensation method, will be described with reference to FIG. 2.

The optical compensation method according to an embodiment is broadly divided into a storage stage, a learning stage and a practical stage. In addition, the flowchart in FIG. 2 includes seven steps in total, from a first step S01 to a seventh step S07. When the flowchart in FIG. 2 starts, the first step S01 is executed.

The first step S01 is a storage stage to store a result of measurement and observation. In the first step S01, the control system 3 observes wavefront disturbance and weather (conditions). More specifically, the wavefront sensor 31 of the control system 3 measures wavefront disturbance of the light that reaches from the target 4A to generate wavefront information. In addition, the meteorological meter 32 of the control system 3 observes weather to generate weather information. The wavefront information and the weather information that are generated are stored in the storage device 342 of the controller 34. It is preferable that the first step S01 is executed a plurality of times under various conditions so that the AI learns correlation between wavefront information and weather information in a higher accuracy in the following second step S02.

The wavefront disturbance to be measured may be expressed, for example, as a group of a plurality of components that corresponds to coefficients of Zernike approximation polynomials, respectively. In other words, wavefront information to be generated may include a group of numerical values that correspond to coefficients of Zernike approximation polynomials, respectively.

Weather to be observed includes, for example, all or a part of air temperature, humidity, wind speed, wind direction, atmospheric component such as aerosol, and the like. In other words, the weather information to be generated may include a group of numerical values that correspond to those weather observation results, respectively.

It is preferable that wavefront information and weather information are stored in a database in association with observation condition information that indicates conditions in that measurement and observation have been performed to obtain such information. Observation conditions to be associated includes, for example, all or a part of latitude, longitude and altitude of the observation device, observation time, horizontal component and vertical component of observation direction, and the like. Associating and storing such information in a database is performed by the processor 341 of the controller 34 with reference to the storage device 342.

Such information that is stored in a database is stored in the storage device 332 of the learning device 33. The second step S02 is executed after the first step S01.

The second step S02 is the learning stage for the AI to learn correlation related to results of measurement and observation. In the second step S02, the learning device 33 executes a program so that the AI learns correlations between wavefront disturbance and weather. More specifically, the processor 331 of the learning device 33 makes the AI learn correlation of wavefront disturbance and weather, and stores learning result information of the AI, that is obtained as a result, in the storage device 332. It should be noted that if various information obtained in the first step S01 is stored in the storage device 332, the learning device 33 can perform AI learning alone. In other words, by storing various information obtained in the first step S01 in the storage device 332, the second step S02 of the learning stage can be executed without using elements except the learning device 33 among elements included in the optical compensation system 1A. The third step S03 is executed after the second step S02.

Figure 3:
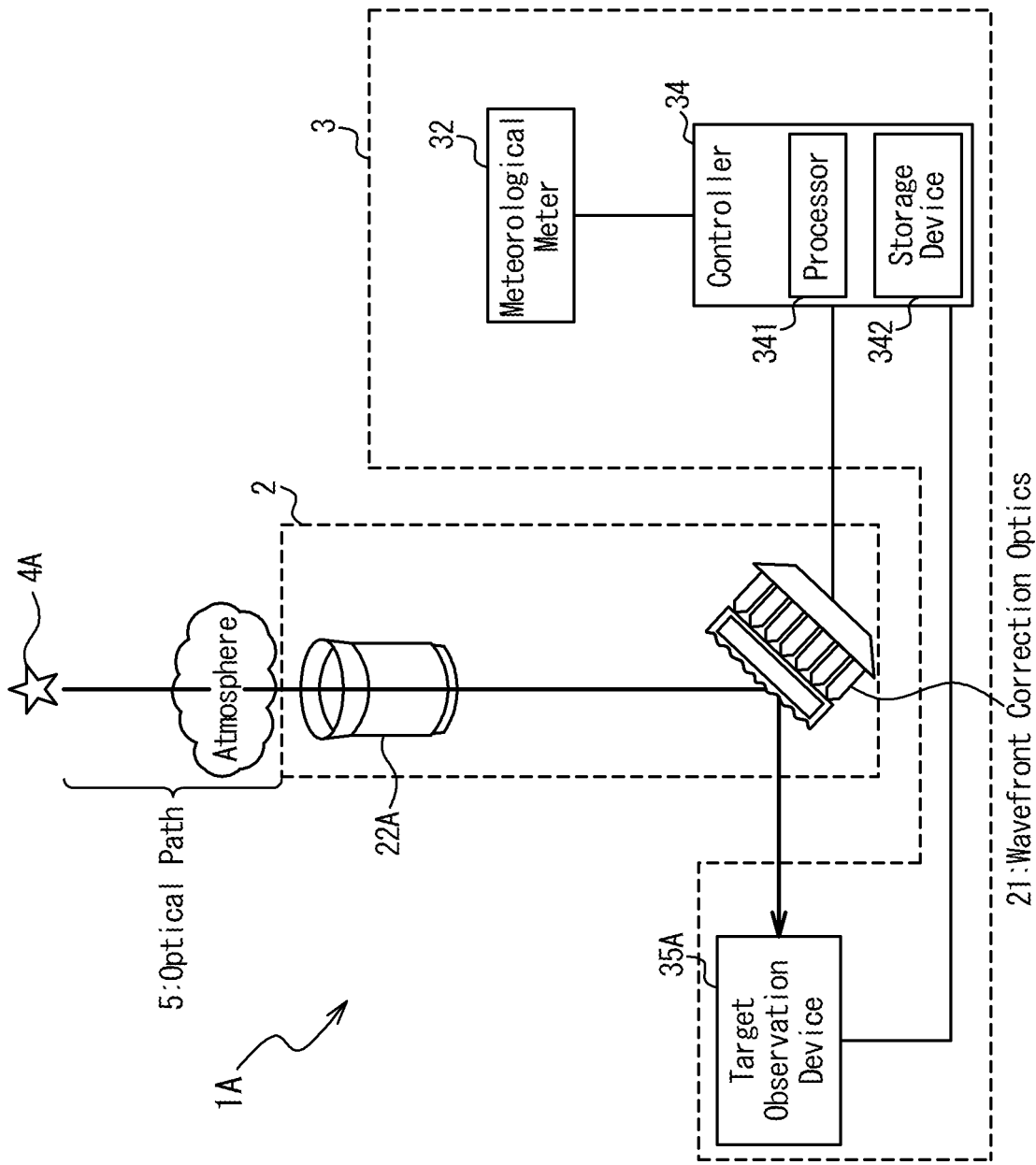
FIG. 3 is a block circuit diagram that shows another configuration example of the optical compensation system according to an embodiment.

The third step S03 and later steps are a practical stage for correcting wavefront disturbance of light to observe the target 4A. The optical compensation system 1A in the practical stage may be configured as the example shown in FIG. 1 while elements that are not used in the practical stage may be omitted therefrom. FIG. 3 is a block circuit diagram that shows another configuration example of the optical compensation system 1A according to an embodiment. Compared with the optical compensation system 1A in FIG. 1, the half mirror 23A, the wavefront sensor 31 and the learning device 33 are omitted from the optical compensation system 1A in FIG. 3. In other words, the practical stage in the third step S03 and later steps can be executed without using the half mirror 23A, the wavefront sensor 31 and the learning device 33.

In the third step S03, the meteorological meter 32 observes weather. It is preferable that the observation of weather in the third step S03 is performed similarly to the case in the first step S01, as well. More specifically, it is preferable that the observation result, that is obtained by the weather observation of the meteorological meter 32, and the weather condition information, that indicates the condition in that this observation has been performed, are provided to the controller 34. The fourth step S04 is executed after the third step S03.

In the fourth step S04, the controller 34 predicts wavefront disturbance. The controller 34 executes the AI by use of the learning result information obtained in the step S02 and predicts a current wavefront disturbance without measuring, based on the observation result obtained in the third step S03. In other words, the controller 34 predicts the current wavefront disturbance based on the learning result information obtained in the second step S02 and the observation result obtained in the third step S03. In the following, the wavefront disturbance that is predicted will be referred to as wavefront disturbance prediction value.

If the learning device 33 and the controller 34 are not connected at the fourth step S04, the learning result information obtained in the second step S02 is stored in the storage device 342 of the controller 34, at least before the fourth step S04 starts. In an opposite case, if the learning device 33 and the controller 34 are connected at the fourth step S04, the controller 34 may read out the learning result information by referring to the storage device 332 of the learning device 33. The fifth step S05 is executed after the fourth step S04.

In the step S05, the controller 34 controls the wavefront correction optics 21. More specifically, the controller 34 controls the wavefront correction optics 21 so as to cancel the wavefront disturbance predicted in the fourth step S04. In other words, the controller 34 controls the wavefront correction optics 21 based on the wavefront disturbance prediction value. In further other words, the controller 34 controls the wavefront correction optics 21 based on the learning result obtained in the second step S02 and the observation result obtained in the third step S03. The controller 34 controls the wavefront correction optics 21 by generating a control signal to control the wavefront correction optics 21 and transmitting the control signal to the wavefront correction optics 21.

The wavefront correction optics 21 corrects the wavefront of the light that reaches from the target 4A under control of the controller 34. If the wavefront correction optics 21 is a deformable mirror, the wavefront correction optics 21 performs a correction of the wavefront of the light so that the wavefront of the light after reflection approaches an ideal state, by deforming a mirror surface that reflects the light that reaches from the target 4A, under control of the controller 34. Wavefront of light being in an ideal state means that, for example, wavefront of light that reaches from a point on the target 4A is planar.

In the sixth step S06, the target observation device 35A observes the target 4A. More specifically, the target observation device 35A observes the target 4A by receiving the light, that reaches from the target 4A, and of which the wavefront is corrected by the wavefront correction optics 21. The target observation device 35A generates an image signal that indicates a result of the observation of the target 4A to transmit to the controller 34.

If the observation of the target 4A is continuously performed after the sixth step S06 is ended ("YES" in the seventh step S07), the wavefront correction optics 21 may be controlled in accordance with changes in the weather. In this case, the third step S03 to the sixth step S06 that are included in the practical stage will be repeatedly executed. If the observation of the target 4A is not continued ("NO" in the seventh step S07), the flowchart in FIG. 2 ends when the sixth step S06 ends.

It is to be noted that in the present embodiment the wavefront sensor 31 is used only in the first step S01 among the above-described steps. That is, the wavefront sensor 31 is not necessary in the following second step S02 and later steps and can be disconnected from the optical compensation system 1A. Generally, a wavefront sensor 31 that measures wavefront disturbance of light has a configuration in that a plurality of optical sensors is arranged in array and a scale thereof is relatively large. For this reason, it may be difficult to transport the wavefront sensor 31 to a site where the light wavefront is corrected. From this point of view, the wavefront sensor 31 being omittable from the optical compensation system 1A according to the present embodiment except in the first step S01 in storage stage means that a hardware of the optical compensation system 1A can be simplified in the learning stage and the practical stage. For this reason, the controller 34 may select an arbitrary configuration, without limitation to an AI, as long as the wavefront disturbance can be calculated based on environmental information in the optical path 5 obtained by the meteorological meter 32 or the like.

In addition, from another point of view, due to a principle with that the wavefront sensor 31 measures wavefront disturbance of light, accuracy and speed thereof are in a trade-off relationship. In other words, measurement speed decrease when increasing measurement accuracy, and in opposite, the measurement accuracy decreases when increasing measurement speed. In the practical stage of the present embodiment, as no real time measurement of wavefront disturbance by use of wavefront sensor 31 is performed, accuracy and speed of wavefront compensation are compatible.

It should be noted that, although the wavefront sensor 31 can be omitted in the practical stage as described above, the wavefront sensor 31 can be used in the practical stage. In this case, the wavefront sensor 31 may perform operation of measuring wavefront in the third step S03 too, similarly to the case in the first step S01, in parallel with the operation of measuring weather by the meteorological meter 32. When using the wavefront sensor 31 in the practical stage, correction accuracy can be increased because convergence of wavefront correction can be speeded up by combining learning result.

Second Embodiment

Figure 4:
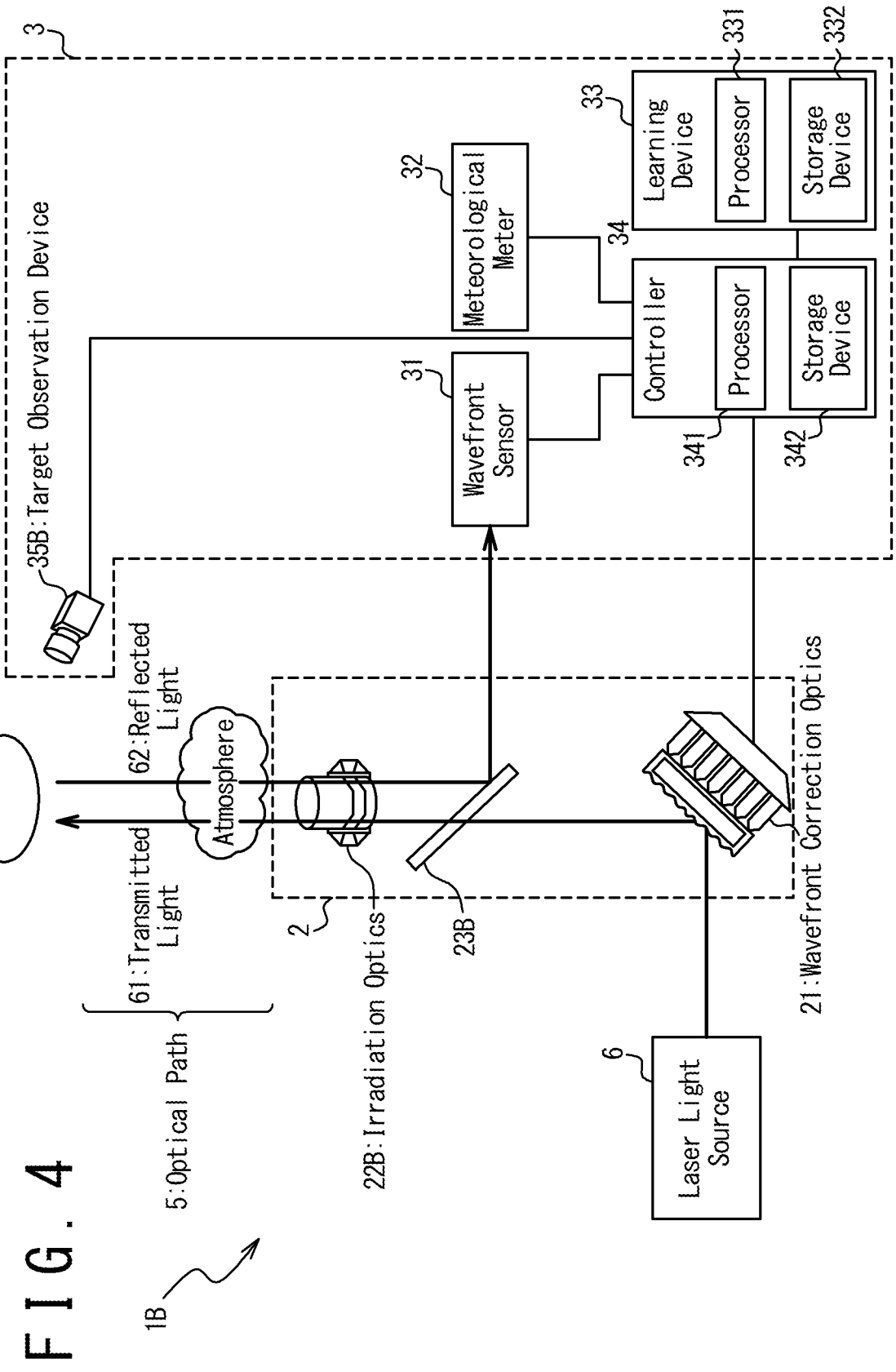
FIG. 4 is a block circuit diagram that shows a configuration example of an optical compensation system according to an embodiment.

FIG. 4 is a block circuit diagram that shows a configuration example of an optical compensation system 1B according to an embodiment. The optical compensation system 1B in FIG. 4 has following differences compared to the optical compensation system 1A in FIG. 1.

As a first difference, while the optical compensation system 1A in FIG. 1 observes light that reaches from the target 4A, the optical compensation system 1B in FIG. 4 generates transmitted light 61, that is laser light, to irradiate the target 4B therewith. For this reason, the optical compensation system 1B in FIG. 4 is further provided with, in addition to the elements of the optical compensation system 1A in FIG. 1, a laser light source 6 that generates laser light. In addition, the optical compensation system 1B in FIG. 4 is provided with irradiation optics 22B instead of the ground optics 22A in the optical compensation system 1A in FIG. 1.

As a second difference, while the optical compensation system 1A in FIG. 1 corrects the wavefront of the light that reaches from the target 4A, the optical compensation system 1B in FIG. 4 corrects wavefront of the transmitted light 61 that is laser light irradiated to the target 4B. Herein, the optical compensation system 1B in FIG. 4 corrects the wavefront of the transmitted light 61 so that the wavefront of the laser light approaches an ideal state when the transmitted light 61 propagates the atmosphere in the optical path 5 and reaches the target 4B. This correction has characteristics opposite to the case of the optical compensation system 1A in FIG. 1 in a meaning of being performed based on a state of the atmosphere in the optical path 5.

As a third difference, the wavefront sensor 31 of the optical compensation system 1A in FIG. 1 observes the light that reaches from the target 4A via the atmosphere in the optical path 5 and the ground optics 22A, and via a reflection by the half mirror 23A. On the other hand, the optical compensation system 1B in FIG. 4 measures wavefront disturbance of reflected light 62 that is the transmitted light 61 generated by the laser light source 6, reaches the target 4B via the wavefront correction optics 21, a separation device 23B, the irradiation optics 22B and the atmosphere in the optical path 5, is reflected by a surface of the target 4B, further travels via the atmosphere in the optical path 5 and the irradiation optics 22B to be partially reflected by the separation device 23B. Herein, the separation device 23B that is arranged instead of the half mirror 23A is configured to guide only the reflected light 62 to the wavefront sensor 31 and so that the transmitted light 61 is not incident on the wavefront sensor 31.

As the fourth difference, the optical compensation system 1B in FIG. 4 is provided with the target observation device 35B instead of the target observation device 35A of the optical compensation system 1A in FIG. 1. Herein, the target observation device 35A of the optical compensation system 1A in FIG. 1 observes the light that reaches from the target 4A via the atmosphere in the optical path 5, the ground optics 22A, the half mirror 23A and the wavefront correction optics 21. On the other hand, the optical compensation system 1B in FIG. 4 may observe the reflected light 62 that is the transmitted light 61 generated by the laser light source 6, reaches the target 4B via the wavefront correction optics 21, the separation device 23B, the irradiation optics 22B and the atmosphere in the optical path 5 and reflected on the surface of the target 4B.

As other configuration of the optical compensation system 1B in FIG. 4 is similar to the optical compensation system 1A in FIG. 1, further detailed explanation is omitted.

Figure 5:
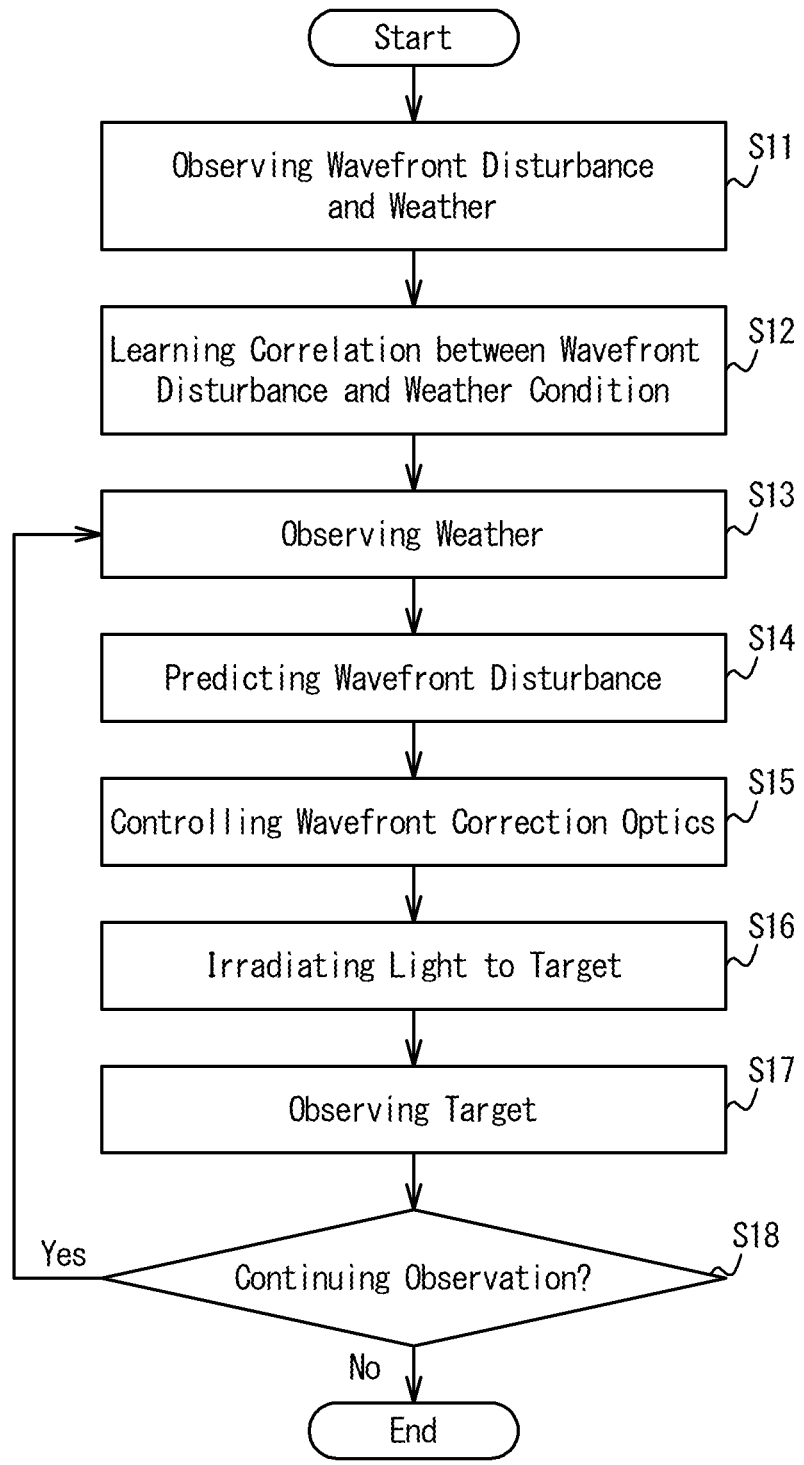
FIG. 5 is a flowchart that shows a configuration example of processes included in an optical compensation method according to an embodiment.

FIG. 5 is a flowchart that indicates a configuration example of processes included in an optical compensation method according to an embodiment. The flowchart in FIG. 5 includes a total of eight steps from the first step S11 to the eighth step S18. When the flowchart in FIG. 5 starts, the first step S11 to the fifth step S15 are executed in this order. Herein, as the contents of the first step S11 to the fifth step S15 are same as the contents of the first step S01 to the fifth step S05 in FIG. 2, respectively, further detailed explanation is omitted. The sixth step S16 is executed after the firth step S15.

In the sixth step S16, the optical compensation system 1B irradiates light to the target 4B. More specifically, at first, the laser light source 6 generates the transmitted light 61 that is laser light. Next, the wavefront correction optics 21 corrects the wavefront of the transmitted light 61. Next, the separation device 23B transmits the transmitted light 61 and the irradiation optics 22B irradiates the target 4B with the transmitted light 61.

In the sixth step S16, as described above, the wavefront of the transmitted light 61 is corrected so that the wavefront of the transmitted light 61 approaches an ideal state when the transmitted light 61 reaches the target 4B after propagating in the atmosphere in the optical path 5. In other words, the wavefront of the transmitted light 61 is not necessarily in an ideal state or close to an ideal state immediately after being corrected by the wavefront correction optics 21. The seventh step S17 is executed after the sixth step S16.

In the seventh step S17, the target observation device 35B observes the target 4B. More specifically, the target observation device 35B optically observes the surface of the target 4B, especially a part thereof that is irradiated with the transmitted light 61. The target observation device 35B generates an image signal that indicates a result of the observation of the target 4B and transmits the image signal to the controller 34. The eighth step S18 is executed after the seventh step S07.

In the eighth step S18, it is determined whether to continue irradiating the target 4B with light. More specifically, the target observation device 35B observes the target 4B, generates a signal that indicates a result of the observation and transmits the signal to the controller 34. The determination whether to continue irradiating the target 4B with light may be performed by a user or performed by the controller 34, based on the result of the observation by the target observation device 35B. It should be noted that the controller 34 may determine whether an influence, that the target 4B has received by irradiation of the transmitted light 61 that is laser light, has reached a desired threshold value, based on a received signal. Herein, a physical quantity specified by the desired threshold value may be brightness, temperature, an amount of disappearance or the like and are not limited by those examples. The determination whether to continue irradiating the target 4B with light may be performed by a user or performed by the controller 34, based on the determination whether the influence the target 4B has received has reached a desired threshold value.

If a result of the determination is "YES", that is, if it is determined to continue irradiating the target 4B with light, the third step S13 to the eighth step S18 that are included in the practical stage will be executed again after the eighth step S18. At that time, the controller 34 may perform a feedback control of the wavefront correction optics 21 based on a result of observation of the target 4B by the target observation device 35B. In addition, by repeatedly executing the practical stage, the controller 34 can control the wavefront correction optics 21 based on changes of the weather.

If a result of the determination is "NO", that is, if it is determined not to continue irradiating the target 4B with light, the flowchart in FIG. 5 ends when the eighth step S18 ends.

Figure 6:
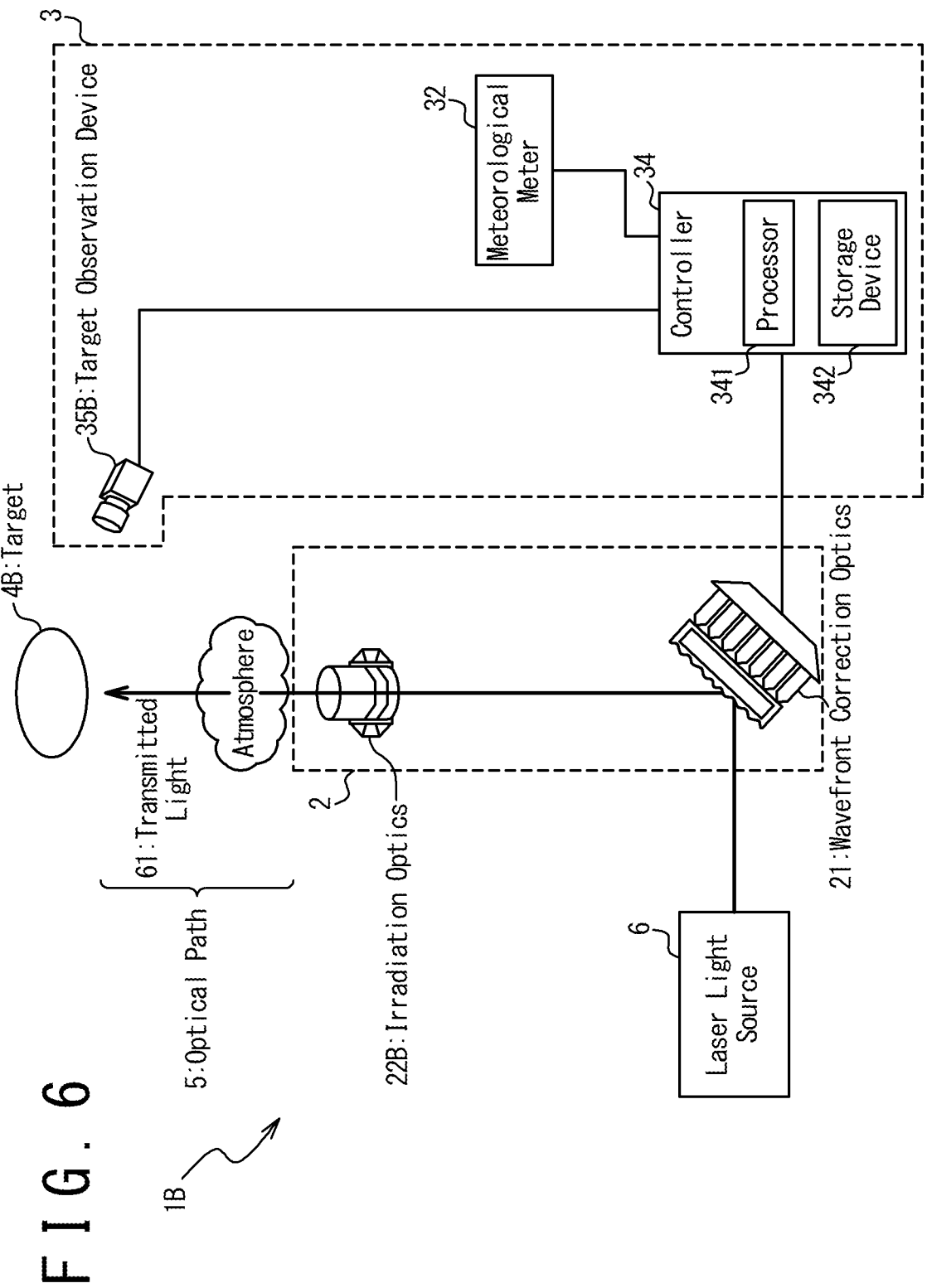
FIG. 6 is a block circuit diagram that shows another configuration example of the optical compensation system according to an embodiment.

As described above, according to the present embodiment, wavefront correction can be performed by the optical compensation system 1B and the optical compensation method, even in a laser light transmission that transfers light energy for example. In addition, similarly to the case of the embodiment shown in FIGS. 1 to 3, the wavefront sensor 31 can be omitted at the practical stage, in the present embodiment too. When trying to correct wavefront by a real time measurement of the wavefront disturbance by use of the wavefront sensor 31, as an area to observe atmospheric fluctuation matches the optical path 5 where the laser light passes through, a separation device 23B that separates the transmitted light 61 and the reflected light 62 needs to be provided to the correction optics 2. From this point of view, in the present embodiment in that the wavefront sensor 31 can be omitted in the practical stage, the hardware configuration can be significantly simplified compared to related technologies. FIG. 6 is a block circuit diagram that shows another configuration example of the optical compensation system according to an embodiment. Compared to the optical compensation system 1B in FIG. 4, the separation device 23B, the wavefront sensor 31 and the learning device 33 are omitted in the optical compensation system 1B in FIG. 6.

Although the invention made by the inventor has been described above in detail based on embodiments, it is needless to say that the present invention is not limited to the above-described embodiments and various modifications can be made without departing from the gist thereof. In addition, each of features described in the above embodiments can be freely combined within a technically consistent range.

The present application claims priority based on the Japanese Patent Application No. 2018-212665 filed on Nov. 13, 2018 and herein incorporates all disclosures thereof.

The invention claimed is:

1. An optical compensation system comprising:
   wavefront correction optics configured to correct a wavefront of light that passes through a given optical path;
   a sensor configured to obtain environmental information in the optical path; and
   a controller configured to calculate, based on the environmental information, a predicted wavefront disturbance of the light that has passed through the optical path and control the wavefront correction optics so as to cancel the predicted wavefront disturbance,
   wherein the environmental information includes weather information,
   wherein the controller generates wavefront information from a measured wavefront disturbance of the light,
   wherein a database is made to store correlation of the wavefront information and the weather information with corresponding observation condition information indicating conditions in which measurement is performed to obtain the wavefront information and the weather information, and
   wherein a predicted wavefront disturbance of the light is calculated based on the correlation and the environmental information obtained by the sensor.

2. The optical compensation system according to claim 1, wherein the controller is further configured to control the wavefront correction optics based on a fluctuation of the obtained environmental information.

3. The optical compensation system according to claim 1, wherein the sensor includes a meteorological meter configured to observe weather.

4. The optical compensation system according to claim 1, further comprising:
   ground optics arranged so that the light that has passed through the optical path further passes therethrough; and
   a target observation device configured to observe the light that reaches from an external target via the ground optics and the wavefront correction optics, generate an image signal that indicates a result of observing the light, and transmit the image signal to the controller.

5. The optical compensation system according to claim 1, further comprising:
   a light source configured to generate the light; and
   irradiation optics arranged in the optical path and configured to irradiate an external target with the light that travels to the optical path via the wavefront correction optics.

6. The optical compensation system according to claim 5, further comprising:
   a target observation device configured to observe the light that reaches from the target, generate an image signal that indicates a result of observing the light, and transmit the image signal to the controller,
   wherein the controller is further configured to perform a feedback control of the wavefront correction optics further based on a fluctuation of a result of an observation by the target observation device.

7. The optical compensation system according to claim 1, further comprising:
   a wavefront sensor configured to measure the wavefront disturbance.

8. The optical compensation system according to claim 1, wherein the controller is further configured to execute an Artificial Intelligence (AI), that is configured to receive an input of the environmental information and outputs the predicted wavefront disturbance of the light that has passed through the optical path, to calculate the predicted wavefront disturbance.

9. The optical compensation system according to claim 8, further comprising:
   a learning device configured to make the AI learn.

10. An optical compensation method including:
    obtaining, by a sensor, environmental information in a given optical path;
    calculating, by a controller, a predicted wavefront disturbance of light that has passed through the optical path, based on the environmental information; and
    controlling, by the controller, wavefront correction optics so as to cancel the predicted wavefront disturbance,
    wherein the environmental information includes weather information,
    wherein the controller generates wavefront information from a measured wavefront disturbance of the light,
    wherein a database is made to store correlation of the wavefront information and the weather information with corresponding observation condition information indicating conditions in which measurement is performed to obtain the wavefront information and the weather information, and
    wherein a predicted wavefront disturbance of the light is calculated based on the correlation and the environmental information obtained by the sensor.

11. The optical compensation system according to claim 9,
   wherein the learning device makes the AI learn the correlation, and
   wherein the controller calculates a predicted wavefront disturbance of the light, based on a leaning result of the correlation learnt by the AI and the environmental information obtained by the sensor.

* * * * *